(12) United States Patent
Koshti et al.

(10) Patent No.: US 12,514,800 B2
(45) Date of Patent: *Jan. 6, 2026

(54) PERSONAL AND HOME CARE COMPOSITIONS COMPRISING FATTY ACIDS FROM TUNG SEED OIL AS ANTIMICROBIAL PRESERVATIVE

(71) Applicant: GALAXY SURFACTANTS LTD., Maharashtra (IN)

(72) Inventors: Nirmal Koshti, Piscataway, NJ (US); Bhagyesh Jagannath Sawant, Maharashtra (IN); Kishor Pundalik Bari, Maharashtra (IN)

(73) Assignee: GALAXY SURFACTANTS LTD., Maharashtra (IN)

( * ) Notice: Subject to any disclaimer, the term of this patent is extended or adjusted under 35 U.S.C. 154(b) by 74 days.

This patent is subject to a terminal disclaimer.

(21) Appl. No.: 17/329,849

(22) Filed: May 25, 2021

(65) Prior Publication Data
US 2022/0202670 A1   Jun. 30, 2022

(30) Foreign Application Priority Data
Dec. 30, 2020 (IN) .............................. 202021057267

(51) Int. Cl.
| | |
|---|---|
| A61K 8/36 | (2006.01) |
| A61K 8/18 | (2006.01) |
| A61K 8/26 | (2006.01) |
| A61K 8/27 | (2006.01) |
| A61K 8/29 | (2006.01) |
| A61K 8/34 | (2006.01) |
| A61K 8/35 | (2006.01) |
| A61K 8/37 | (2006.01) |
| A61K 8/40 | (2006.01) |
| A61K 8/44 | (2006.01) |
| A61K 8/49 | (2006.01) |
| A61K 31/192 | (2006.01) |
| A61Q 5/02 | (2006.01) |
| A61Q 17/00 | (2006.01) |
| A61Q 17/04 | (2006.01) |
| A61Q 19/10 | (2006.01) |
| C11D 3/00 | (2006.01) |
| C11D 3/20 | (2006.01) |
| C11D 3/42 | (2006.01) |
| C11D 3/48 | (2006.01) |
| A23B 2/733 | (2025.01) |
| A23B 2/754 | (2025.01) |
| A23B 2/762 | (2025.01) |
| A23B 2/771 | (2025.01) |
| A23B 7/154 | (2006.01) |

(52) U.S. Cl.
CPC .............. *A61K 8/361* (2013.01); *A61K 8/18* (2013.01); *A61K 8/26* (2013.01); *A61K 8/27* (2013.01); *A61K 8/29* (2013.01); *A61K 8/345* (2013.01); *A61K 8/35* (2013.01); *A61K 8/37* (2013.01); *A61K 8/40* (2013.01); *A61K 8/44* (2013.01); *A61K 8/4966* (2013.01); *A61K 31/192* (2013.01); *A61Q 5/02* (2013.01); *A61Q 17/005* (2013.01); *A61Q 17/04* (2013.01); *A61Q 19/10* (2013.01); *C11D 3/0036* (2013.01); *C11D 3/2079* (2013.01); *C11D 3/42* (2013.01); *C11D 3/48* (2013.01); *A23B 2/733* (2025.01); *A23B 2/754* (2025.01); *A23B 2/762* (2025.01); *A23B 2/771* (2025.01); *A23B 7/154* (2013.01); *A23V 2002/00* (2013.01); *C11D 2111/14* (2024.01)

(58) Field of Classification Search
None
See application file for complete search history.

(56) References Cited

U.S. PATENT DOCUMENTS

| | | | | |
|---|---|---|---|---|
| 2009/0317341 | A1* | 12/2009 | Madison | A61K 8/34 562/598 |
| 2010/0021407 | A1* | 1/2010 | Tsotsoros | A61K 8/898 510/122 |
| 2011/0130459 | A1* | 6/2011 | Spencer | A61K 8/922 514/560 |
| 2011/0226275 | A1* | 9/2011 | Fischer | A45D 7/02 132/203 |

FOREIGN PATENT DOCUMENTS

CN    108348422 A  *  7/2018  ............... A61K 8/02

OTHER PUBLICATIONS

INCI Decoder <www.incodecoder.com> "glycerin" and "Behenamidopropyl Dimethylamine" (Year: 2022).*

(Continued)

*Primary Examiner* — Nicole P Babson
(74) *Attorney, Agent, or Firm* — Trupti P. Joshi (57) ABSTRACT

Disclosed herein are personal care and home care composition comprising the whole of fatty acids (unfractionated) of Tung seed oil (*Aleurites fordii, Vernicia fordii* (family: Euphorbiaceae) as an antimicrobial preservative. The invention further discloses process of preparation of such compositions having fatty acids of Tung seed oil which are produced by saponification of commercially available Tung oil from seeds of the nuts of Tung tree. The home and personal care compositions comprising 'whole' mixture of fatty acids derived from the corresponding triglyceride oil at concentration of 0.5 to 2% w/w of the total composition help preserve the composition without any additional antimicrobial preservatives.

7 Claims, 4 Drawing Sheets

(56) References Cited

OTHER PUBLICATIONS

Food and Agriculture Organization of the United Nations. "Minor oil crops—Individual monographs". Retrieved Oct. 15, 2007. (Year: 2007).*

English translation of CN 108348422 A (Year: 2018).*

A. Salvador, A. Chisvert. "Sunscreen analysis: A critical survey on UV filters determination" Analytica Chimica Acta vol. 537, Issues 1-2, pp. 1-14 (Year: 2005).*

Ziosi et al. "Caprylyl Glycol/Phenethyl Alcohol Blend for Alternative Preservation of Cosmetics" Cosmetics & Toiletries <https://www.cosmeticsandtoiletries.com/research/literature-data/article/21835521/caprylyl-glycolphenethyl-alcohol-blend-for-alternative-preservation-of-cosmetics> (Year: 2013).*

\* cited by examiner

PERSONAL AND HOME CARE COMPOSITIONS COMPRISING FATTY ACIDS FROM TUNG SEED OIL AS ANTIMICROBIAL PRESERVATIVE

CROSS-REFERENCE TO RELATED APPLICATION

This application claims the benefit of priority to Indian Patent Application number 202021057267 filed Dec. 30, 2020, the disclosure of which is hereby incorporated by reference in its entirety.

FIELD OF INVENTION

The present invention relates to personal and home care compositions, comprising a 'broad spectrum' antimicrobial derived from renewable source for preservation. The antimicrobial of the present invention is compatible with most commonly used ingredients of home and personal care compositions. Moreover, it is a good alternative to eco-toxic antimicrobials such as parabens, formaldehyde releasers (DMDM Hydantoin, diazolidinyl urea and other urea derivatives) and to a host of halogenated chemicals (Chloromethyl isothiazolinone, Iodopropynyl butyl carbamate, Triclosan, Chlorphenesin, Bronopol etc.). The present invention relates to use of 'whole' fatty acids (unfractionated) as an antimicrobial preservative for home and personal care products, wherein the 'whole' fatty acids are chemically synthesized from triglyceride oil of seeds in nuts of Tung tree.

BACKGROUND AND PRIOR ART OF THE INVENTION

Preserving personal care products from microbial degradation is quite challenging. Most cosmetics products in the form of creams, lotions, gels, shampoos, body-washes and face-washes contain significant amount of water. This provides a very hospitable environment for the microbial growth. This is true with home care products like dish-wash liquids or glass/table top cleaners or carpet cleaners. In addition to water, other ingredients in such formulations can be a good source of nutrients to microbes. Another pertinent point to be reckoned here is that the shelf-life of the personal care products and the period after opening the container by the consumer is quite long compared to pharmaceutical products or food products. Unlike pharmaceutical products, home and personal care products are neither sterilized nor packed in hermetic conditions. Thus, the requirement for preservation of the personal care products is, indeed, quite challenging. This is further compounded by the limited choice of antimicrobials since the available approved antimicrobials are very few and those which have good antimicrobial activity are quite toxic. Consumers want products meant for topical applications to be free from toxic antimicrobials that are used as preservatives. Very effective antimicrobials that are used currently, are implicated in serious toxicity issues to human as well as to environment. For example, parabens are implicated in disrupting endocrine system, ultimately linked to breast cancer [(*Pharmacology & Toxicology* (Vol. 86(3), pp 110-13, March 2000, *Toxicology and Applied Pharmacology* (Vol. 153(1), pp. 12-19 (November 1998), *Journal of Veterinary Medical Science* (Vol. 64(3), pp. 227-35 (March 2002, *Journal of Applied Toxicology*, 24 (3): 167-176, (2004)]. Formaldehyde is classified as Category 3 CMR (carcinogenic, mutagenic and reproductive toxic) and hence all formaldehyde releasers are under the cloud. This class includes the work-horse preservatives such as DMDM hydantoin, diazolidinyl urea, imidazolidinyl urea and Quaternary-15.

Another class of very effective antimicrobials is 'isothiazolinones'. Methyl and chloromethyl isothiazolinones have been used in personal care but these are reported to be neurotoxic and skin sensitizers (*Journal of Neuroscience* 22 (17): 7408-7416. *The Lancet*, Volume 333, Issue 8633, Pages 314-316 (1989). Chloromethyl isothiazolinone (generally abbreviated as CIT) is far more toxic and most of the leading personal care products manufacturers have stopped using it.

Halogenated antimicrobials have their own share of toxicity issues. For example, Triclosan, once a popular antimicrobial for hand sanitizers, is phased out due to its toxicity. It has been implicated in eco-toxicity issues (related to algae, dolphins). It is reported to be an endocrine disruptor (thyroid function) and is reported to impair cardiac and skeletal muscles. There seems to be a special concern for children who are at higher risk of allergies and the immune systems (*Toxicological Sciences,* 2009, 107 (1): 56-64, *Reproductive Toxicology*, April 2009, 27(2): 177-185). Companies such as Johnson and Johnson, Proctor & Gamble and Reckitt Benckiser have removed it from hand wash products. Triclosan's ecotoxicity is such a big concern that its usage has been completely banned by the state of Minnesota in the USA.

Iodopropynyl butyl carbamate, another halogenated antimicrobial, is a contact allergen (*American Journal of contact dermatitis* 13(2), 77-79 (2002). The presence of iodine in the molecular structure gets it implicated in Goiter and malfunctioning of thyroid gland. It is not allowed in Japan and in European Union (EU) and generally, elsewhere, it is allowed only up to 0.02% in leave-on products. Similarly, EU permits usage of methyl dibromo glutaronitrile only up to 0.1% and that too in only rinse-off products. Another brominated molecule is Bronopol, very widely used once upon a time, is banned today in countries like Canada for its application in cosmetics. It is involved in allergic reactions as well as generation of N-nitroso amines that are known to be carcinogenic. The quaternary ammonium compounds (examples are cetyl pyridinium chloride, benzethonium chloride, benzalkonium chloride) exhibit good antimicrobial activity but their utility in personal care industry is limited due to incompatibility with anionic surface active agents. The cationic antimicrobials are completely neutralized by the anionic surface active agents that are present in large excess in home and personal care formulation (8 to 20%).

Thus, most of the antimicrobials with phenolic nature or containing halogen (chlorine, bromine, or iodine) are toxic. Also, the big class of 'formaldehyde releasing antimicrobials' is being phased out due to highly toxic nature of formaldehyde. Examples of this class are DMDM hydantoin, imidazolidinyl urea and diazolidinyl urea.

To avoid the above mentioned toxic antimicrobials, the industry did come up with alternatives antimicrobial preservatives that are largely based on organic acids such as sorbic acid, benzoic acid, dehydroacetic acid, and alcohols such as phenoxyethanol, benzyl alcohol (Cosmetics Directive Annex VI).

In September 2012, French Agency ANSM (Agence nationale de sécurité des médicaments et des produits de santé) raised concerns about the use of Phenoxyethanol as preservative for baby care products due to inadequate safety data and demanded that the upper limit for dose be lowered to 0.4% from 1.0% for baby care products meant for children under the age of 3. In 2016, Scientific Community of Consumer Safety (SCCS) finally declared it to be safe up to 1.0% level for cosmetics. Phenoxyethanol is also reported to depress the central nervous system (Schmuck G, Steffens W, Bomhard E (July 2000). "2-Phenoxyethanol: a neurotoxicant?" Archives of Toxicology. 74 (4-5): 281-3) and it may cause vomiting and diarrhea, which can lead to dehydration in infants. Some baby care products are available in the market that mention on the label about them being 'free from phenoxyethanol'. (Colgate's baby care brand Tom's of Main, moisturizing lotion). Also, there are baby wipes out in the market that are preserved without phenoxy ethanol (Phenoxy ethanol-free baby wipes are offered by P & G, Seventh generation, The Honest company, Kimberly Clarke etc.).

Benzyl alcohol, another antimicrobial, suffers from disadvantage of being an allergen causing allergic contact dermatitis reactions (E. J. Curry and E. M. Warshaw, *Dermatitis,* 2005; 16 (4): 203-208) and strong benzaldehyde like aroma puts a limitation on its deployment as antimicrobial across the personal care products.

Dehydroacetic acid or its sodium salt is a completely synthetic chemical based on petrochemicals (diketene and malonic acid) has serious limitation of forming colored complexes by chelating traces of iron. It seriously discolors the formulations and hence not a preservative of choice in many cases.

Benzoic acid is a petro-chemical based antimicrobial and some formulators try to avoid benzoic acid due to some unscientific reporting on social media talks about it getting oxidized to carcinogenic benzene.

Avoiding use of petrochemicals and synthetic chemistry that pollutes and generates waste while manufacturing any bulk chemicals is one of the major measures/goals towards saving the planet. Avoiding use of petrochemicals and disposals of non-biodegradable wastes is the way to control carbon emission (Green House Gases) results in slowing down the process of global warming and the catastrophic consequences that planet is already suffering. Antimicrobial preservatives are 'bulk chemicals' and their usage (and their manufacture) can't afford to disturb the equilibrium of the planet.

A bulk antimicrobial has to be made from 'renewable source' and it should be biodegradable and should cause no harm to human being and ecosystem. It should possess a broad spectrum antimicrobial activity. Simultaneously, should be organoleptically acceptable and compatible with commonly used home and personal care ingredients.

In view of the limitations stemming from the concern about safety to human and ecology (toxic nature), synthetic chemistry involving hazardous chemicals, non-renewable petrochemical source, and the restrictions and concerns cited above for the majority of antimicrobials, there is an urgent need to develop an antimicrobial preservative that would be based on 'renewable source', that would be biodegradable and amenable to large scale manufacture.

The present invention discloses a broad spectrum antimicrobial preservative that is non-toxic, biodegradable and made from renewable source for home and personal care products.

OBJECTIVES OF THE INVENTION

The objective of the present invention is to provide home and personal care compositions with an antimicrobial that is biodegradable, eco-friendly, and derived from a 'renewable' source.

Another objective of the present invention is to create a preservation system avoiding use of petrochemicals or hazardous reagents or chemicals at any stage of synthesis or processing.

Yet, another objective of the present invention is to create an antimicrobial preservative that would be effective against bacteria, yeast and mold (broad spectrum) and that would be compatible with commonly used personal care and home care ingredients.

Another objective of the present invention is to create an antimicrobial preservative system for home and personal care products that would avoid all functional groups in molecule that are known for being cytotoxic like phenolic moiety, halogens (chlorine, bromine, iodine) and formaldehyde releasing functionality.

SUMMARY OF THE INVENTION

The present invention discloses personal care and home care composition comprising unfractionated whole fatty acids derived from oil of Tung seeds as broad spectrum antimicrobial preservative together with one or more personal and home care ingredients.

According to one aspect of the present invention there is provided personal care and home care products comprising fatty acids derived by chemical transformation of Tung seed oil (obtained from *Aleurites fordii*), as an antimicrobial preservative.

In an aspect, the unfractionated whole fatty acids derived from Tung seed oil as an antimicrobial preservative in the personal and home care composition is in an amount ranging from 0.5 to 2% w/w.

In yet another aspect, the personal care composition comprises 0.5-2.0% w/w of fatty acids derived from Tung seed oil along with;
    a. 2 to 20% w/w of surfactants,
    b. 1 to 20% w/w of UV absorbers,
    c. 1 to 10% w/w of inorganic sunscreens,
    d. 1 to 10% w/w of hair and skin benefiting agents, and
    e. 0 to 10% w/w of other additives.

In yet another aspect, the home care compositions comprises 0.5-2.0% w/w fatty acids derived from Tung seed oil along with
    a. 2 to 40% w/w of surfactants,
    b. 1 to 5% w/w of rheology modifiers,
    c. 1 to 10% w/w of enzymes,
    d. 2 to 50% w/w of fillers and binders,
    e. 1 to 5% w/w of conditioners,
    f. 1 to 5% w/w of anti-soil redeposition agents,
    g. 1 to 5% w/w of optical brighteners.

According to another aspect there is provided a process for preparation of the fatty acids from Tung seed oil and formulations of the personal and home care products with the same.

The benefits and advantages of the present disclosures will be appreciated and understood by those with ordinary skilled in the art, from the following detailed description and the claims.

BRIEF DESCRIPTION OF

DETAILED DESCRIPTION OF THE INVENTION

As discussed in the background section, all those powerful traditional antimicrobials that have been used for preservation of home and personal care products are reported to be toxic to human being and in some cases they are reported to be toxic to other forms of life in the environment. All powerful antimicrobials are implicated in toxicity issues ranging from allergies to neurotoxicity to carcinogenicity. Many are reported to disrupt endocrine system. Personal care industry is consciously phasing out the toxic antimicrobial preservatives such as chloromethyl isothiazolinone, Triclosan, parabens, DMDM Hydantoin, and Quaternium-15. However, efficacious yet completely safe alternative preservatives are still not available. In view of this constraint, the personal care and home care industry is trying to use combinations of 'mild' antimicrobials such as phenoxyethanol, benzyl alcohol, dehydroacetic acid, sorbic acid and benzoic acid to meet the need of non-toxic preservation of home and personal care formulations. However, all of these 'gentle' antimicrobials are derived from 'non-renewable' petrochemical. This is the biggest concern of today. The world has woken up to the damage that has been done by burning the fossil fuel, increase in carbon emission (Green House Gases) leading to the global warming with catastrophic consequences that the planet is already suffering. The damage, that is already done, needs to be reversed. Humans can no longer have the liberty of producing chemicals that are not biodegradable, that are not made from 'renewable source' and that are toxic to living systems of the planet. Humans can no longer use hazardous chemicals to synthesize useful ingredients. In today's time useful functional ingredients of the past lose their usefulness or importance if their manufacturing is accompanied by generation of hazardous waste or hazardous reagents or dangerous process (very high temperature or pressures) of manufacture.

The updated list (January 2020) of antimicrobial preservatives allowed in EU (Cosmetic directive Annex V) reveals 60 antimicrobials for personal care with their upper limits. Out of these 60 antimicrobials, 58 are synthetically made, only two are without involving classical organic synthesis. The synthetic antimicrobials invariably involve complex organic synthesis and it should be noted that none of these is based on 'renewable source' and 'Green Chemistry'.

It can be noted that chlorinated, brominated, iodinated antimicrobials, parabens, formaldehyde donors are reported to be toxic. Certainly, these toxic preservatives need to be avoided, but the alternative allowed antimicrobials that are relatively safe are very few, namely, benzoic acid, dehydroacetic acid, sorbic acid, benzyl alcohol and phenoxyethanol. In the absence of any other good alternatives these 'gentler' antimicrobials are being used in combination with a goal of exploiting synergy between them.

It is important to note that none of the above is made from 'renewable source'. Even some of boosters of antimicrobial preservation are also of synthetic origin, namely, caprylyl glycol and 2-ethyl hexyl glycerol.

In summary, none of the current antimicrobials from the toxic or relatively low toxic or non-toxic categories is derived from 'renewable' source or easy to synthesize on the basis of 'Green' and simple synthesis (Anastas and Warner, *Green Chemistry: Theory and Practice New York, Oxford University Press,* 1998).

Surprisingly, the inventors of the present invention have found that fatty acids of Tung seed oil (*Aleurites fordii*, China wood oil) obtained from triglycerides provide antimicrobial activity and act as preservative in personal and home care products. Further the same involves a simple process that meets the principles of 'Green chemistry'.

The commercially available Tung oil is obtained from seeds of nuts of Tung tree. Saponification of the commercially available oil followed by acidification of saponified mass affords the mixture of fatty acids, namely, α-eleostearic acid, linoleic acid, oleic acid and palmitic acid. The home or personal care composition of the present invention comprises this 'whole' mixture as stand-alone preservative at concentration of 0.5 to 2% w/w.

In an embodiment, the present invention relates to a personal and home care composition comprising unfractionated whole fatty acids derived from Tung seed oil as broad spectrum antimicrobial preservative together with one or more personal and home care ingredients.

The antimicrobial preservative derived from renewable source, is compatible with most commonly used ingredients of home and personal care compositions, and is completely biodegradable and non-toxic to both human being and environment.

In another embodiment, the whole of fatty acids derived from Tung seed oil is used as stand-alone preservative at concentration ranging from 0.5 to 2% w/w of the home or personal care composition.

In yet another embodiment, the whole of fatty acids derived from Tung seed oil is useful as UV protector, as skin benefiting agent such as emollient, moisturizer, re-fatting agent; as rheology modifier, in the personal and home care compositions of the present invention.

In another embodiment, the whole of fatty acids derived from Tung seed oil may be used in the personal and home care composition in combination with known gentle antimicrobial compounds or adjuvants to enhance or boost antimicrobial activity synergistically. Examples of such gentle antimicrobials are benzoic acid or phenoxy ethanol. The examples of such adjuvants are ethylhexyl glyceryl ether, caprylyl glycol, 1,3-propane diol or EDTA etc.

The personal care compositions of this invention include the compositions for skin care and hair care. The personal care ingredients are selected from anionic surfactants, amphoteric surfactants, zwitterionic surfactants, cationic surfactants, non-ionic surfactants, bio-surfactants (glycolipids, lipopeptides), pearlizers, emollients, anti-inflammatory, UV absorbers, UV blockers, synthetic and/or natural polymeric conditioners, silicones, gums, rheology modifiers, vegetable oils, film formers, vitamins, protein derivatives, anti-acne agents, anti-dandruff agents, moisturizers, humectants, botanicals, emulsifiers and other skin and hair actives.

In an embodiment, the personal care composition of the present invention comprises 0.5-2.0% w/w of fatty acids derived from Tung seed oil along with;
 a. 2 to 20% w/w of surfactants,
 b. 1 to 20% w/w of UV absorbers,
 c. 1 to 10% w/w of inorganic sunscreens,
 d. 1 to 10% w/w of hair and skin benefiting agents,
 e. and
 f. 0 to 10% w/w of other additives UV absorbers are selected from Octocrylene, avobenzone, benzophenones, Octyl methoxy cinnamate, ethyl hexyl triazone, Tinosorb S, Homosalate and Octyl salicylate. The inorganic sunscreens are selected from ZnO, iron oxide, calamine, titanium dioxide and Kaoline.

The skin and hair benefitting agents are selected from emollients, humectants, vitamins, synthetic and/or natural polymeric conditioners, vegetable oils, protein derivatives, anti-inflammatory anti-acne agents, anti-dandruff agents, moisturizers, botanicals and other skin and hair actives.

The other additives are selected from pearlizers, rheology modifiers, silicones, gums, film formers, emulsifiers, hydrotropes, chelating agents.

The home care compositions of this invention are mainly cleansing compositions such as dish-wash (hand and machine), hard surface cleaners (floor, glass, kitchen-top, bathroom, toilet bowl etc.), and laundry care (hand and machine wash). The home care ingredients are selected from anionic surfactants, cationic surfactants, amphoteric surfactants, zwitterionic surfactants, non-ionic surfactants, bio-surfactants, enzymes (proteases, lipases, cellulases), optical brighteners, polymers, rheology modifiers, pearlizers, urea, hydrotropes, polyalkylene glycols, anti-soil-redeposition agents, fillers, builders, binders, bleaches, chelating agents and the like.

Accordingly, the home care composition of the present invention comprises 0.5-2.0% w/w of fatty acids derived from Tung seed oil along with;
a. 2 to 40% w/w of surfactants,
b. 1 to 5% w/w of rheology modifiers,
c. 1 to 10% w/w of enzymes,
d. 2 to 50% w/w of fillers and binders,
e. 1 to 5% w/w of conditioners,
f. 1 to 5% w/w of anti-soil redeposition agents,
g. 1 to 5% w/w of optical brighteners.

The mild antimicrobials which may be used in the personal and home care product include phenoxyethanol or benzoic acid and adjuvants are selected from ethylhexyl glyceryl ether, caprylyl glycol, 1,3-propane diol or EDTA.

The embodiments of the present invention will now be described in detail below:

Fatty Acids Derived from Tung Seed Oil:

Tung seed oil is obtained from the seeds of the nuts of Tung tree (*Aleurites fordii*, *Vernicia fordii* (family: Euphorbiaceae)). It is commercially available and is commonly known as China wood oil. The oil sequestered from the seed is used in the manufacture of lacquers, varnishes, paints, resins, brake-linings and in polishing compounds. The oil is used to protect the wooden surfaces from the external aggression by forming a hydrophobic film on the surface. This behaviour is known as drying property and Tung seed oil exhibits this film forming (drying) property when exposed to air due to the reaction of its fatty alkyl chain component with the atmospheric oxygen forming ether linkages between the doubly bonded carbons of alkyl chains of triglycerides. This intra-molecular (linking of alkyl chains of same triglyceride molecule) or inter-molecular ether linkage is akin to the cross linking of macromolecules in polymer chemistry, ultimately yielding a polymeric film.

The typical fatty acids of triglycerides of Tung seed oil comprise of majorly α-Eleostearic acid (CAS No 506-23-0), Linoleic acid (CAS No 60-33-3), Palmitic acid (CAS No 57-10-3) and Oleic acid (CAS 112-80-1). The composition typically has α-Eleostearic acid in upwards of 80% and total unsaturated fatty acids are around 95%.

Major component of fatty acids of Tung seed oil is α-Eleostearic acid (ESA), a poly-unsaturated fatty acid (PUFA). ESA has three double bonds and has a pair of conjugated double bonds that makes it highly reactive. It is important to note that conjugated long chain fatty acids are reported to have anticancer properties for cancers of mammary glands, colon and skin (Belury M. A.; Inhibition of carcinogenesis by conjugated linoleic acid: potential mechanisms of action. *J. Nutr.;* 132: 2995-8; 2002). ESA also occurs in oil of seeds of Bitter Gourd which is consumed by human race since time immemorial. ESA is reported to possess anti-inflammatory properties (Pubali Dhar et al.; *Nanomedicine*, Vol. 14, No. 5, 2019). ESA has been shown to ameliorate (https://doi.org/10.1371/journal.pone.0024031, Bevan et al. August 2011) inflammatory bowel disease in animals via dietary route. Korean scientists recently reported ESA in cure of breast cancer. They established the mechanism of suppression of cancer cell by ESA (*Cancer Science*, 2010; 101: 396-402).

In addition to ESA, the minor components of Tung fatty acids are palmitic acid, oleic acid, and linoleic acid. These fatty acids occur in many other edible oils that are consumed by human race.

Figure 3:
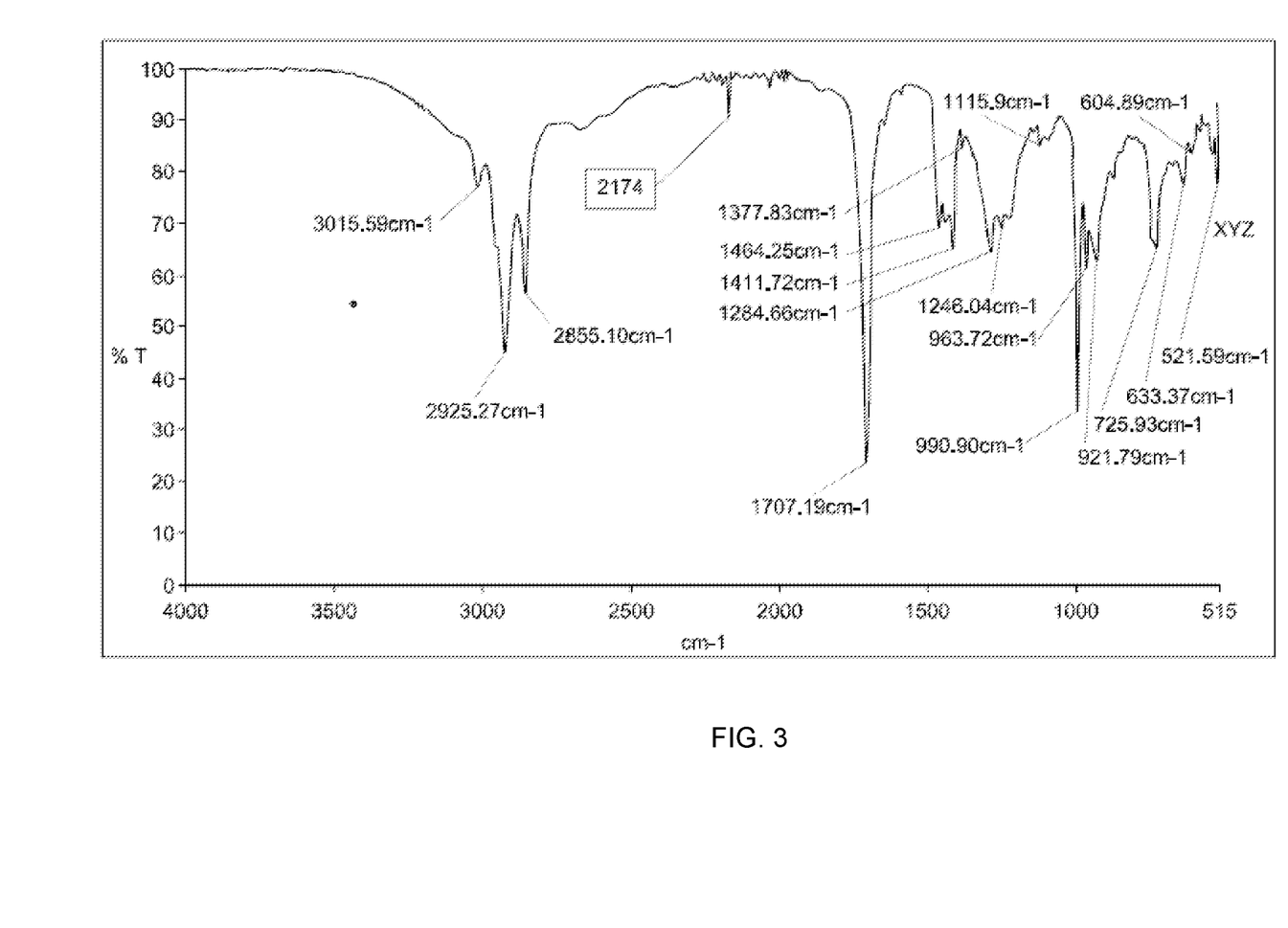
FIG. 3 depicts the IR spectrum of fatty acids derived from Tung seed oil.
Figure 4:
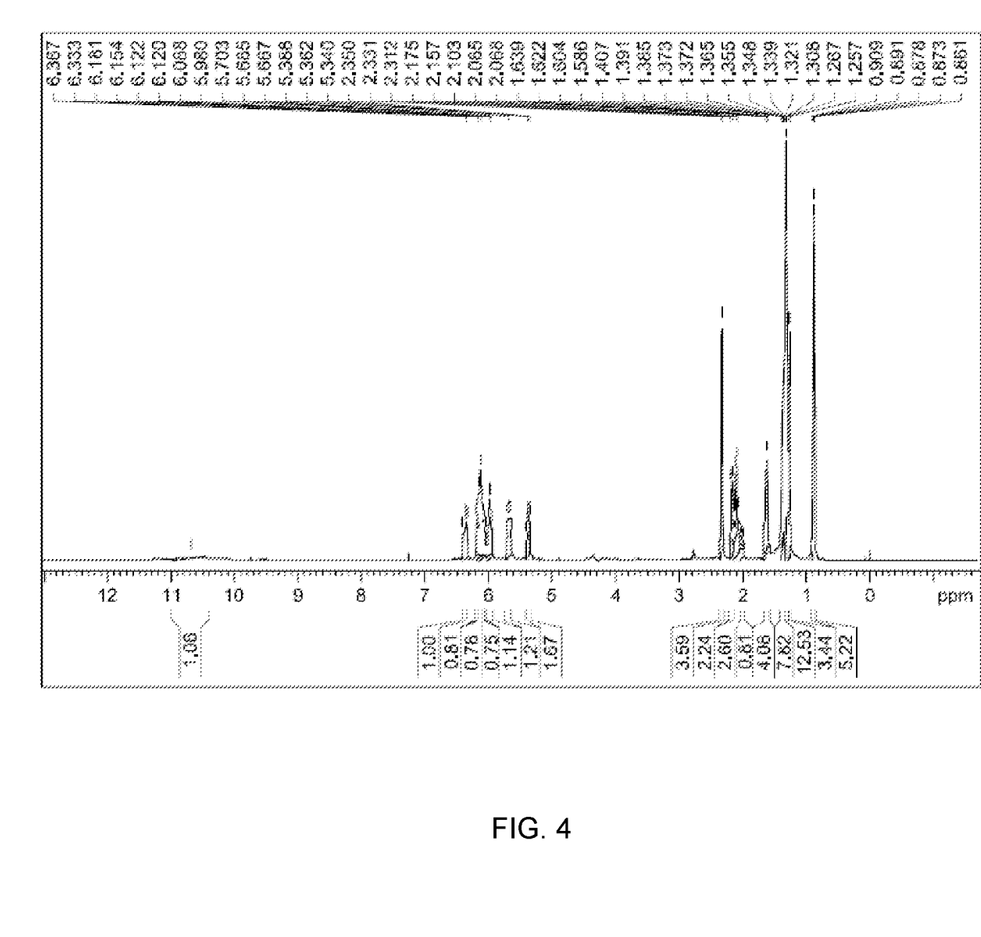
FIG. 4 depicts the NMR spectrum of fatty acids derived from Tung seed oil.

The 'whole' (unfractionated) fatty acids of Tung seed oil that are used in the present invention are obtained by saponification of Tung seed oil (alkaline hydrolysis) and isolation of fatty acids after acidifying the alkaline hydrolysate. The 'whole' fatty acids are washed with water to free it from any acidity of mineral acids that are used for the acidification (The saponification process and isolation of 'whole' of fatty acids is described in detail in Example 1). The whole of Tung seed oil fatty acids, a mixture of fatty acids (chromatography results for alkyl chain distribution are given in Example 1), is a low-melting pale yellow colored solid with a very good UV absorbing properties arising out of conjugation of ESA (E1% 1cm is around 1600 at 270 nm, Example 1). The fatty acid of Tung seed oil shows the characteristic IR frequency of 1707 and 995 cm$^{-1}$ (FIG. 3). The reason for it being a low melting solid instead of a liquid is the presence of two double bonds with 'trans' geometry.

Figure 1:
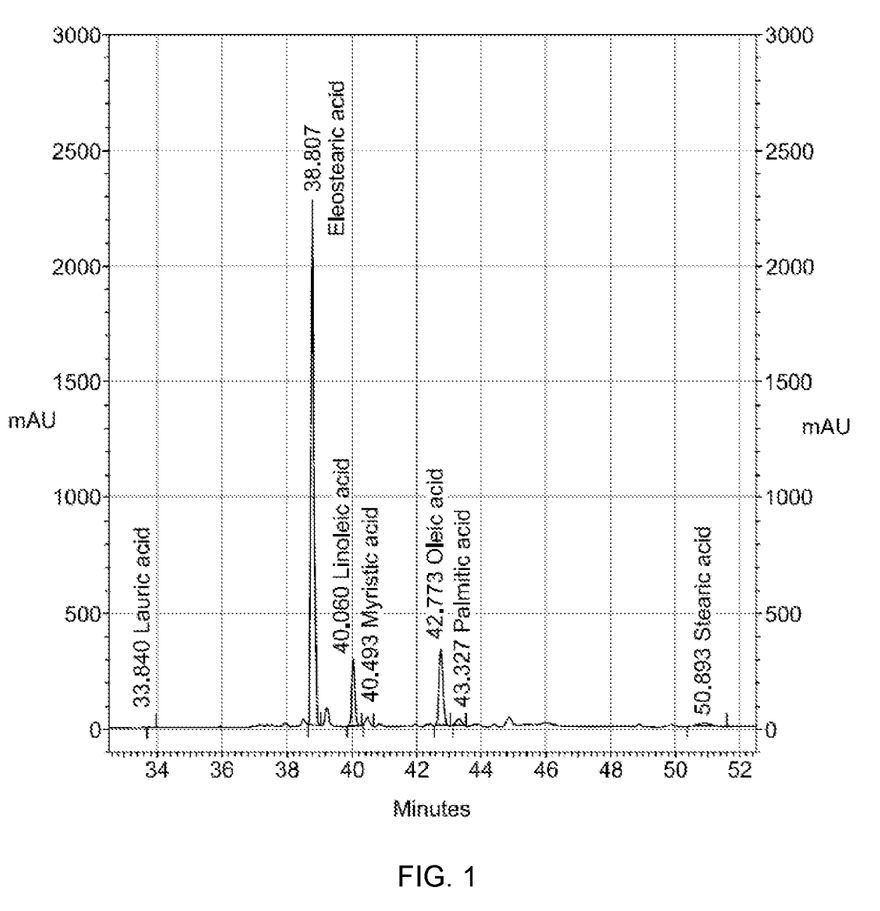
FIG. 1 depicts the HPLC chromatogram of fatty acids derived from Tung seed oil.

The fatty acid distribution has been determined by chromatography (FIG. 1). It is carried out by converting fatty acids into a volatile derivative like methyl ester or silyl ester. Alternatively, by HPLC, which is particularly suitable for thermosensitive molecules like ESA. The fatty acids of Tung seed oil are resolved by 'reversed phase' chromatography using water-acetonitrile gradient system starting from 1:1 to 100% acetonitrile. Chromatogram and the chromatographic conditions are given in Example 1. The analysis of hydrolyzed commercial Tung seed oil does show ESA to be around 82%. The other C18 acids have been, oleic and linoleic, around 6% each. The saturated fatty acids are found to be 2 to 4%.

Personal Care Composition with Fatty Acids Derived from Tung Seed Oil for Re-Fatting and Moisturizing Benefit:

Fatty acids and oils containing saturated or unsaturated alkyl chains are almost integral part of personal care products. The various types of lipids are part of the surfaces of hair and skin. In a cleansing process many times excessive removal of constituent lipids results into drying of skin and hair. This drying of skin and hair leads to serious consequences. Dry hair become rough and brittle, difficult to comb leading to easy breakage. As regards to skin, loss of lipids leads to increased rate of moisture loss from stratum corneum that ultimately results into itchiness of skin to chapping/cracking of skin. To overall moisturize and retain the moisture balance of skin by replacing lost lipids, oftentimes, oils and fatty acids are included in all skin and hair care products. The present personal care composition includes the fatty acids of Tung seed oil which helps to restore the lost lipids of stratum corneum.

Personal care composition with Fatty acids derived from Tung oil as UV-protector for the formulation ingredients as well as UV protector for hair and skin.

Figure 2:
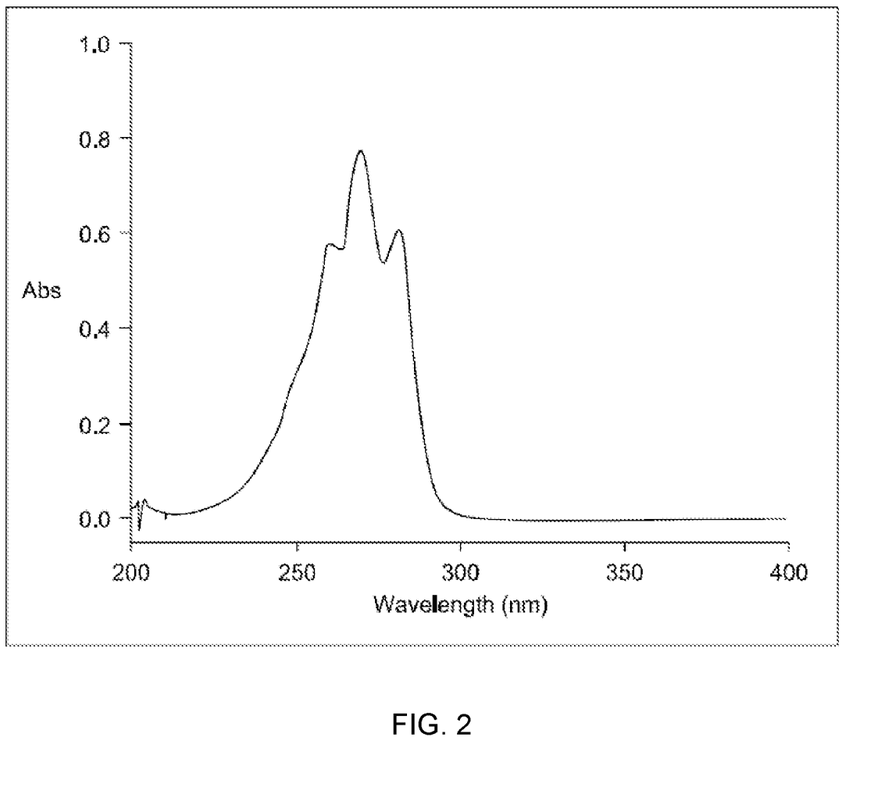
FIG. 2 depicts the UV absorption spectra of fatty acids derived from Tung seed oil.

Personal care composition comprising fatty acids, as obtained synthetically from Tung seed oil by aforementioned process, have good UV absorbing activity arising from the conjugated system of the fatty acids and is evident from its value of E1% lcm which is 1600 at 270 nm and 360 at 290 nm. In view of incorporation of the fatty acids in the personal care composition, not only the ingredients of the formulations are protected but also the skin and hair are protected from the ravages of solar radiation when the formulations are applied. The fatty acids of Tung seed oil in the composition absorb in the UV B region significantly. The same is evident from the values of E1% lcm which is 360 at 290 nm (FIG. 2). UV B radiation of solar spectrum is the most damaging since it causes skin cancer.

The present inventors have found that fatty acids of Tung seed oil absorbs UV rays more than double compared to some popular personal care UV absorbers like Homosalate and Octyl salicylate as can be seen from E1% 1 cm. Both homosalate and Octyl salicylate are popular sunscreen molecules all over the world unlike OMC which is reported to be toxic to marine life and hence banned in certain places.

TABLE 1

| UV absorbing compounds | $\lambda_{max}$ | E1%, 1 cm |
| --- | --- | --- |
| Fatty acids of Tung seed oil | 290 nm | 360 |
| Homosalate (118-56-9) | 305 nm | 180 |
| Octyl salicylate (118-60-5) | 305 nm | 165 |

Antimicrobial Efficacy of the 'Whole' Fatty Acids Derived from Tung Seed Oil

The 'whole' of fatty acids derived from Tung seed oil have been found to exhibit a broad spectrum of antimicrobial activity. It showed decent activity against representative Gram negative bacteria, Gram positive bacteria, yeast and mold as is evident from the minimum inhibitory concentrations of the fatty acids from Tung seed oil as in Example 1.

The personal care composition comprising the fatty acids of Tung seed oil provides skin benefits (acting as emollient, moisturizer, re-fatting agent) and also provide antimicrobial effect without using any other preservative.

The present inventors have tested several personal care and home care formulations for the preservation efficacy using PCPC (Personal Care Products Council, Washington D.C., formerly known as CTFA) protocol ('Evaluation of preservatives to protect cosmetics' by D. Orth in *Cosmetics and Toiletries*, March 91). The initial inoculation level of microbes for this study was around $10^7$ cfu/mL for bacteria and $10^6$ cfu/mL for yeast and mold in the formulation. Both 'rinse-off' and 'leave-on' formulations passed the challenge tests.

These challenge test experiments demonstrate the antimicrobial effect achieved by the present formulations comprising the fatty acids from Tung seed oil and without having any added preservative. Thus, the present inventors have found personal/home care compositions comprising Tung seed oil fatty acids with no added preservative demonstrating antimicrobial activity so that no additional preservative is required for storage of such compositions.

Alternately, the alkali metal salts such as sodium or potassium salts or alkaline earth metal salts of the whole of fatty acids derived from Tung seed oil can be used for preservation. For best efficacy, the pH of the final home and personal care formulation should be around 6.0 or below.

The personal care composition comprises of whole fatty acids derived from Tung seed oil as an antimicrobial preservative in amount of 0.5 to 2% w/w and one or more ingredients selected from anionic surfactants, amphoteric surfactants, zwitterionic surfactants, cationic surfactants, non-ionic surfactants, biosurfactants, pearlizers, emollients, anti-inflammatory, UV absorbers, UV blockers, synthetic and/or natural polymeric conditioners, silicones, gums, rheology modifiers, vegetable oils, film formers, vitamins, protein derivatives, anti-acne agents, anti-dandruff agents, moisturizers, humectants, botanicals, emulsifiers and other skin and hair actives.

The home care composition comprises of whole fatty acids derived from Tung seed oil as an antimicrobial preservative in an amount of 0.5 to 2% w/w and one or more ingredients selected from anionic surfactants, cationic surfactants, amphoteric surfactants, zwitterionic surfactants, polymers, non-ionic surfactants, bio-surfactants, rheology modifiers, pearlizers, urea, hydrotropes, polyalkylene glycols and chelating agents.

Fatty Acids Derived from Tung Seed Oil as Rheology Modifier:

Surprisingly, it is also found that the personal care and home care formulations comprising fatty acids of Tung seed oil have additional formulation benefits (rheology modifier) in terms of boosting the viscosity of skin pH formulation, particularly in compositions based on surfactants that are meant for cleansing. Examples 2 and 3 show significant increase in viscosity of the formulations in going from 1% to 2% of total formulation. At 1% concentration of Tung seed fatty acids in shampoo formulation has viscosity of 1800 cps at 25° C. and 2.0%, the viscosity of the same formulation shoots to 2600 cps.

Tung Seed Fatty Acids with Other 'mild, Biodegradable' Antimicrobials and Adjuvants According to another aspect of the present invention it has been further found that in the formulations of the present invention fatty acids of Tung seed oil (that are 100% derived from 'renewable source)' additional anti-microbial compounds or adjuvants may be added that can enhance or boost antimicrobial activity synergistically. Examples of such gentle ('but not based on renewable source') antimicrobials are benzoic acid or phenoxy ethanol. The examples of such adjuvants are ethylhexyl glyceryl ether, caprylyl glycol or EDTA etc. Alcohols, glycols or other antimicrobials derived from fermentation process using microbes and vegetable feed stock for microbes can be combined with fatty acids of Tung seed oil. For example, 1,3-propane diol (Zemea propane diol from DuPont Tate and Lyle) obtained from Maize starch by fermentation process.

EXAMPLES

The present invention is now described by way of non-limiting illustrative examples. The details of the invention provided in the following examples are given by the way of illustration only and should not be construed to limit the scope of the present invention. The Tung seed oil used in the present invention is purchased from Arista Industries, USA.

Bio-surfactant, 'Sophorolids' are synthesized as per the literature procedure (1) Saerens, K. M., Zhang, J., Saey, L., Van Bogaert, I. N. and Soetaert, W., *Yeast,* 28(4), pp. 279-292 (2011); (2) Hubert. Jane. Karen Plé. Mahmoud Hamzaoui, Gladys Nuissier. Imane Hadef, Romain Reynaud, Arnaud Guilleret, and Jean-Hugues Renault.

*Comptes Rendus Chimie* 15, pp 18-28 (2012)) using glucose and oleic acid as carbon source and the yeast, *Candida bombicola*. After the isolation of sophorolipids as 50% aqueous solution, it is then mixed with 2% of fatty acids of Tung seed oil. The yeast *C. bombicola* ATCC 22214, is obtained from the National Collection of Industrial Microorganisms (NCIM) (Pune, INDIA). The strain is grown on MGYP media at 28° C., maintained at −20° C. (30% glycerol stock) and sub-cultured after every four weeks.

All other aqueous surfactants are used from in-house production to ensure that these are preservative-free. Examples are cocamido propyl betaine, sodium lauryl ether sulphate, Lauryl polyglucoside, disodium laureth sulphosuccinate, polyquaternium −7, sodium cocoyl glycinate, sodium cocoyl taurate and sodium lauroyl sarcosinate. Sodium cocoyl glutamate and sodium cocoyl isethionate are in solid form and without preservative. Lauryl amine oxide and sodium laureth sulphate 70% are self-preserving. 1,3-propanediol distearate is prepared according to the literature procedure (U.S. Pat. No. 9,833,395 B2).

Example 1

Synthesis of Fatty Acids from Tung Seed Oil

A mixture of Tung seed oil (50 g, 0.18 gmol), sodium hydroxide (48% solution, 16 g, 0.2 gmol) in ethanol (220 mL) was stirred under reflux (75° C.) for 4 h. The reaction mass was concentrated by recovering ethyl alcohol by distillation (140 mL). To the residual mass, water (100 mL) was added and stirred for half an hour at 75° C. It was then poured into water (1 liter) and the whole mixture was acidified (pH 2.0) with concentrated hydrochloric acid to precipitate the fatty acid. The whole mass was heated to 75° C. to keep the liberated fatty acids in the molten condition for the ease of subsequent phase separation and washing with water to afford fatty acids (41 g) as pale yellow colored liquid that solidified slowly.

The analysis of fatty acids of Tung seed oil is as follows: The off-white solid with melting point ranging from 41° C. to 48° C. Moisture content: 0.2%, Acid value: 207 mg KOH/g, Iodine value 164 mg of Iodine per gram of sample.

UV: λmax 270 nm, E1% 1 cm: 1600, IR: 1706 cm$^{-1}$ carbonyl of carboxyl group and sharp 995 cm$^{-1}$ $^1$H NMR (CDCl$_3$, 400 MHz): δ$_H$ 0.861-0.909 (m, —CH$_3$), 1.257-1.411 (m, —CH$_2$—), 1.586-1.639 (m, —CH$_2$—), 2.002-2.191 (m, —CH=CH—CH$_2$—), 2.331 (t, 7.60 Hz, —CO—CH$_2$—), 5.362-5.407 (m, —CH=CH—, cis), 5.649-5.721 (m, —CH=CH—, cis), 5.952-6.008 (m, —CH=CH—, trans), 6.059-6.181 (P, —CH=CH—, trans), 6.333-6.395 (m, —CH=CH—, trans), 10.685 (s, —COOH)

The MIC of fatty acids derived from Tung seed oil were calculated as per standard protocol laid down by PCPC (Personal Care Product Council).

TABLE 2

Minimum inhibitory concentration of Tung seed fatty acids

| Microorganism | MIC of Example 1 (%) |
|---|---|
| *Staphylococcus aureus* ATCC 6538 | 0.6 |
| *Pseudomonas aeruginosa* ATCC 15442 | 0.8 |
| *Burkholderia cepacia* ATCC 25416 | 0.8 |
| *Escherichia coli* ATCC 8739 | 0.5 |
| *Candida albicans* ATCC 10231 | 0.5 |
| *Aspergillus niger* ATCC 16404 | 0.8 |
| *Propiniobacterium acnes* MTCC 1951 | 0.5 |
| *Malassezia furfur* MTCC 1374 | 0.8 |

TABLE 3

| Chromatographic conditions | |
|---|---|
| a. UV detection at | 270 nm |
| b. Flow rate | 1 mL/min |
| c. Injection volume | 100 µL |
| d. Temperature | 40° C. |
| e. Column | Agilent TC C18 (250 × 4.6 mm); 5 µm or any equivalent C18 column |
| f. Run time | 55 min |
| e. Mobile phase | Gradient (water containing 0.1% phosphoric acid and acetonitrile |

The fatty acids derived from Tung seed oil are resolved by 'reversed phase' chromatography using water-acetonitrile gradient solvent system starting from 1:1 to 100% acetonitrile. The analysis of hydrolyzed commercial Tung seed oil does show ESA to be around 82%. The other C18 acids have been, oleic and linoleic, around 6% each. The saturated fatty acids are found to be 2 to 4% (Table 4).

TABLE 4

| Retention Time | Area % | Name |
|---|---|---|
| 33.840 | 0.30 | Lauric Acid |
| 38.807 | 81.38 | Eleostearic acid |
| 40.060 | 6.89 | Linoleic acid |
| 40.493 | 0.28 | Myristic acid |
| 42.773 | 6.14 | Oleic acid |
| 43.327 | 2.34 | Palmitic acid |
| 50.893 | 2.67 | Stearic acid |

Example 2

Preparation of a 'Sulphate-Free' Body-Wash

| Components | (% W/W) |
|---|---|
| Phase A | |
| Water (Aqua) | Make up to 100 |
| Sodium cocoyl glutamate | 7.00 |
| sodium cocoyl isethionate | 3.00 |
| Lauryl polyglucoside (50%) | 8.00 |
| Cocoamidopropyl betaine (36%) | 18.00 |
| Sodium gluconate | 0.10 |
| Phase B | |
| Glyceryl mono laurate | 2.0 |
| Fatty acids of Example 1 | 2.00 |
| 1,3-Propane diol distearate | 5.00 |
| Phase C | |
| Citric acid (50% aq.) | Q.S. to pH 5.5 to 6.0 |
| Fragrance, Color | Q.S. |

All three phases are made separately at ambient temperature by gentle stirring of the components as mentioned in the above table. The whole of phase B is added to stirred mass of phase A and agitation is continued till the mass becomes homogeneous. pH of the stirred mass is adjusted to 5.5 with citric acid solution. After ensuring the uniformity of pH, color and fragrance are added and stirring continued till the mass becomes homogeneous. The viscosity of the formulation is found to 2600 cps).

The above formulation was tested for the preservation efficacy using PCPC (Personal care products council, Washington D.C., formerly known as CTFA) protocol ('Evaluation of preservatives to protect cosmetics' by D. Orth in Cosmetics and Toiletries, March 91). The initial inoculation level of microbes for this study was around $10^6$ to $10^7$ cfu/mL for bacteria and $10^5$ cfu/mL for yeast and mold in the formulation. The formulation passed the challenge tests (Table 5).

As expected the same formulation in absence of preservative, failed the challenge test after $7^{th}$ day of inoculation (Table 6). Further, when the preservative system of the present invention was replaced with one of commonly used preservatives, phenoxyethanol, the formulation failed the challenge test. (Table 7).

The results of Table 5 to 7 indicate the efficacy of the present antimicrobial over the known phenoxy ethanol (not based on renewable source) in the body wash composition.

Example 3

Preparation of a Shampoo Formulation

| Components | % W/W |
|---|---|
| Phase A | |
| Water (Aqua) | Q.S. to make 100 |
| Sodium Lauryl Ether Sulfate (28%) | 25.00 |

TABLE 5

Preservation efficacy of Fatty acids from Tung seed oil in body wash

| Body Wash | Staphylococcus aureus ATCC 6538 | Propionibacterium acnes MTCC 1951 | Escherichia coli ATCC 8739 | Pseudomonas aeruginosa ATCC 15442 | Burkholderia cepacia ATCC 25416 | Candida albicans ATCC 10231 | Malassezia furfur ATCC 1374 | Aspergillus niger MTCC 16404 |
|---|---|---|---|---|---|---|---|---|
| Initial cfu/mL | $1.4 \times 10^7$ | $9 \times 10^7$ | $8 \times 10^7$ | $2 \times 10^7$ | $1.5 \times 10^7$ | $1.3 \times 10^7$ | $1.1 \times 10^7$ | $1.2 \times 10^6$ |
| 0 day | $5.7 \times 10^6$ | $6.4 \times 10^6$ | $5.4 \times 10^6$ | $8.2 \times 10^6$ | $5 \times 10^6$ | $1.8 \times 10^6$ | $3 \times 10^6$ | $4.1 \times 10^5$ |
| 7 days | <10 | <10 | <10 | <10 | <10 | <10 | <10 | <10 |
| 14 days | <10 | <10 | <10 | <10 | <10 | <10 | <10 | <10 |
| 21 days | <10 | <10 | <10 | <10 | <10 | <10 | <10 | <10 |
| 28 days | <10 | <10 | <10 | <10 | <10 | <10 | <10 | <10 |

Yet, as mentioned above it can be observed that there is more than 3 log reduction in case of bacteria and 2 log reduction for yeast and mold after seven days. This composition is then kept for stability study at room temperature as well as at 40° C. The samples at 40° C., when 're-challenged' for the efficacy of the preservation system again after a month, passed the 'repeat challenge' tests i.e. maintained the microbes at level of <10 cfu.

-continued

| Components | % W/W |
|---|---|
| Disodium Laureth Sulfosuccinate (40%) | 15.00 |
| Cocamidopropyl Betaine (36%) | 7.00 |
| Sodium gluconate | 0.10 |

TABLE 6

Preservation efficacy of body wash with no added preservative

| Body Wash | Staphylococcus aureus ATCC 6538 | Propionibacterium acnes MTCC 1951 | Escherichia coli ATCC 8739 | Pseudomonas aeruginosa ATCC 15442 | Burkholderia cepacia ATCC 25416 | Candida albicans ATCC 10231 | Malassezia furfur MTCC 1374 | Aspergillus niger ATCC 16404 |
|---|---|---|---|---|---|---|---|---|
| Initial cfu/mL | $1.4 \times 10^7$ | $9 \times 10^7$ | $8 \times 10^7$ | $2 \times 10^7$ | $1.5 \times 10^7$ | $1.3 \times 10^7$ | $1.1 \times 10^7$ | $1.2 \times 10^6$ |
| 0 day | $5.7 \times 10^6$ | $6.4 \times 10^6$ | $5.4 \times 10^6$ | $8.2 \times 10^6$ | $5 \times 10^6$ | $1.8 \times 10^6$ | $3 \times 10^6$ | $4.1 \times 10^5$ |
| 7 days | TNTC | TNTC | TNTC | TNTC | TNTC | TNTC | TNTC | TNTC |

TNTC-Too numerous to count.

TABLE 7

Preservation efficacy of body wash preserved with phenoxyethanol

| Body Wash | Staphylococcus aureus ATCC 6538 | Propionibacterium acnes MTCC 1951 | Escherichia coli ATCC 8739 | Pseudomonas aeruginosa ATCC 15442 | Burkholderia cepacia ATCC 25416 | Candida albicans ATCC 10231 | Malassezia furfur MTCC 1374 | Aspergillus niger ATCC 16404 |
|---|---|---|---|---|---|---|---|---|
| Initial cfu/mL | $1.4 \times 10^7$ | $9 \times 10^7$ | $8 \times 10^7$ | $2 \times 10^7$ | $1.5 \times 10^7$ | $1.3 \times 10^7$ | $1.1 \times 10^7$ | $1.2 \times 10^6$ |
| 0 day | $5.7 \times 10^6$ | $6.4 \times 10^6$ | $5.4 \times 10^6$ | $8.2 \times 10^6$ | $5 \times 10^6$ | $1.8 \times 10^6$ | $3 \times 10^6$ | $4.1 \times 10^5$ |
| 7 days | $3.3 \times 10^4$ | <10 | <10 | <10 | <10 | $1.5 \times 10^3$ | $3 \times 10^4$ | $1.5 \times 10^5$ |

-continued

| Components | % W/W |
|---|---|
| Phase B | |
| Cocomonoethanolamide | 3.00 |
| Ethylene Glycol Distearate | 2.00 |
| Fatty acids of Example 1 | 2.00 |
| Phase C | |
| Polyquaternium - 7 | 3.00 |
| Citric acid 50% aq. | pH between 5.0 to 6.0 |
| Fragrance, Color | Q.S. |

Procedure:

Phase B is made by gently stirring three ingredients at about 60° C. This homogeneous blend of phase B at 50° C. is added to the stirred mixture of surfactants of Phase A at room temperature and stirring is continued till the whole mass becomes homogeneous. Phase C ingredients are then added and stirring continued to ensure the uniformity. pH is adjusted between 5.5 to 6 with citric acid. This is followed by addition of color and fragrance and continued stirring till the mass becomes homogeneous.

The above formulation was tested for the preservation efficacy using PCPC (Personal care products council, Washington D.C., formerly known as CTFA) protocol ('Evaluation of preservatives to protect cosmetics' by D. Orth in *Cosmetics and Toiletries*, March 91). The initial inoculation level of microbes for this study was around $10^6$ to $10^7$ cfu/mL for bacteria and $10^5$ cfu/mL for yeast and mold in the formulation. The formulation passed the challenge tests.

TABLE 8

| Body Wash | Staphylococcus aureus ATCC 6538 | Propionibacterium acnes MTCC 1951 | Escherichia coli ATCC 8739 | Pseudomonas aeruginosa ATCC 15442 | Burkholderia cepacia ATCC 25416 | Candida albicans ATCC 10231 | Malassezia furfur MTCC 1374 | Aspergillus niger ATCC 16404 |
|---|---|---|---|---|---|---|---|---|
| Initial cfu/mL | $1.4 \times 10^7$ | $9 \times 10^7$ | $8 \times 10^7$ | $2 \times 10^7$ | $1.5 \times 10^7$ | $1.3 \times 10^7$ | $1.1 \times 10^7$ | $1.2 \times 10^6$ |
| 0 day | $6.4 \times 10^6$ | $1.6 \times 10^7$ | $1.4 \times 10^7$ | $8 \times 10^6$ | $8.2 \times 10^6$ | $9 \times 10^5$ | $4.3 \times 10^6$ | $4 \times 10^5$ |
| 7 days | <10 | <10 | <10 | <10 | <10 | <10 | <10 | <10 |
| 14 days | <10 | <10 | <10 | <10 | <10 | <10 | <10 | <10 |
| 21 days | <10 | <10 | <10 | <10 | <10 | <10 | <10 | <10 |
| 28 days | <10 | <10 | <10 | <10 | <10 | <10 | <10 | <10 |

Example 4

Preparation of a Sunscreen Cream and its Preservation with Tung Seed Fatty Acids

| Components | (% W/W) |
|---|---|
| Phase A | |
| Water (Aqua) | Q.S. to make 100 |
| Glycerin | 2.00 |
| Laureth - 9 ( Lauryl alcohol 9 EO) | 0.50 |
| Polyethylene glycol 7 Glyceryl Cocoate | 2.00 |
| Sodium gluconate | 0.05 |
| Phase B | |
| Butyl Methoxydibenzoylmethane | 3.00 |
| Octocrylene | 3.00 |
| Ethylhexyl methoxycinnamate | 5.00 |
| Paraffinum Liquidum | 4.00 |
| Stearic Acid | 2.00 |
| Glyceryl mono stearate | 5.00 |

-continued

| Components | (% W/W) |
|---|---|
| Cetearyl Alcohol | 3.50 |
| Isopropyl Myristate | 5.00 |
| Fatty acids of Example 1 | 0.75 |
| Phase C | |
| Fragrance, Color | Q.S. |

Procedure:

Phase A and Phase B are made separately as homogeneous mixtures. Phase B is then added to stirred Phase A and continued stirring till uniform cream is formed. This further homogenized for couple of hours. Finally, fragrance and color are added and blended till uniformly distributed throughout the mass.

Example 5

Preparation of a Face Wash

| Components | (% W/W) |
|---|---|
| Phase A | |
| Water (Aqua) | Q.S. to make 100 |
| Sodium Cocoyl Glycinate (30%) | 10.00 |
| Glycerin | 15.00 |
| Cocamidopropyl Betaine ( 36%) | 8.00 |
| Sodium gluconate | 0.10 |

-continued

| Components | (% W/W) |
|---|---|
| Phase B | |
| Fatty acids of Example 1 | 1.5 |
| Cetearyl Alcohol | 1.00 |
| Ethylene Glycol Distearate | 3.00 |
| Glyceryl stearate | 2.00 |
| Polyethylene glycol 150 Distearate | 0.50 |
| Cocomonoethanolamide | 2.00 |
| Phase C | |
| Polyquaternium - 7 | 2.00 |
| Wheat Amino Acid | 2.00 |
| Fragrance, Color | Q.S. |

Procedure:

Phase A, B and C are made separately. Phase B is made by heating the ingredients at 65-70° C. with gentle agitation. The hot molten oily phase B is added to stirred mass of phase A and continued stirring till the whole mass becomes homogeneous. Phase C is then added to the mass, followed by addition of color and fragrance.

Example 6

Preparation of a Hand Dish-Wash

| Components | % w/w |
| --- | --- |
| Water | Q.S. to make 100 |
| Sodium Laureth Sulfate (28%) | 20.0 |
| Lauryl Amine Oxide (30%) | 6.0 |
| Fatty acids of Example 1 | 2.0 |
| Lauryl polyglucoside (50%) | 4.0 |
| Disodium EDTA | 0.2 |
| Sodium Chloride | 1.0 |
| Citric Acid | pH between 5.0 to 6.0 |
| Fragrance and color | Q.S. |

Procedure:

Sodium lauryl ether sulphate and water are charged first. To this stirred mixture all other ingredients are added and continued to stir. Citric acid is used to adjust the desired pH. Color and fragrance are added and stirred to get homogeneous distribution.

Example 7

Preparation of 'Sulphate-Free' Shampoo Having High Natural Origin Index

| Components | (% W/W) |
| --- | --- |
| Sodium cocoyl sarcosinate (29%) | 10 |
| Sophorolipids (50%) | 7 |
| Sodium cocoyl taurate (40%) | 20 |
| Cocamidopropyl betaine (36%) | 10 |
| Glycerine | 2 |
| Sodium gluconate | 0.5 |
| 1,3 proapane diol distearate | 3 |
| Fatty acids of Example 1 | 2.00 |
| Citric acid ( 50%) | To adjust pH 5.5 |
| Fragrance | Q.S. |
| Deionized water | Q.S. to make 100 |

Procedure:

To a gently stirred water (40%) in a reactor, all surfactants are added in sequence, namely, cocoamidopropyl betaine, sodium cocoyl taurate and sophorolidids. This is followed glycerin and sodium gluconate. Heat the whole mixture to 80° C. To this 1,3-propane diol disteate and fatty acids of Tung seed oil are added. The mixture is cooled slowly and pH is adjusted to 5.5 with citric acid solution. Remaining quantity of water is added under slow agitation. Color and fragrance are added and gentle agitation is continued to ensure the homogeneity of the composition.

Example 8

Preparation of Gentle Body Wash Cleansing Composition with High Natural Origin Index

| Components | (% W/W) |
| --- | --- |
| Sophorolipids | 5 |
| Sodium cocoyl glutamate (powder) | 7 |
| Sodium cocoyl isethionate (powder) | 3 |

-continued

| Components | (% W/W) |
| --- | --- |
| Cocoamidopropyl betaine ( 36%) | 10 |
| Fatty acids of Example 1 | 2.00 |
| Sodium gluconate | 0.5 |
| Polyethylene glycol 150 distearate | 1.0 |
| Citric acid or hydrochloric acid | To adjust pH between 5.0 to 6.0 |
| Deionized water | Q.S. to make 100 |
| Fragrance, Color | Q.S. |

Procedure:

To a gently stirred water (50% of required quantity) in a reactor, all surfactants are added in sequence, namely, cocoamidopropyl betaine, sodium cocoyl glutamate, sodium cocoyl isethionate and sophorolidids. This is followed by addition of fatty acids of Tung seed oil of Example 1 and sodium gluconate. The whole mixture is warmed to 80° C. This is followed by addition of polyethylene glycol 150 distearate and stirred gently. On cooling to room temperature pH is adjusted to 5.5 with citric acid solution. Remaining quantity of water, color and fragrance are added and gentle agitation is continued to ensure the homogeneity of the composition.

Example 9

Preparation of Hand Dish Washing Composition with High Natural Origin Index

| Components | (% W/W) |
| --- | --- |
| Lauryl polyglucoside (50%) | 10 |
| Cocoamidopropyl betaine (36%) | 20 |
| Sophorolipids (50%) | 5 |
| Sodium chloride | 1.0 |
| Fatty acids of Example 1 | 2 |
| Sodium gluconate | 0.5 |
| Citric acid (50%) | Q.S.to get pH between 5.0 to 6.0 |
| Fragrance, Color | Q.S. |
| Deionized water | Q.S. to make 100 |

Procedure:

To a gently stirred water (50%) in a reactor, all surfactants are added in sequence, namely, lauryl polyglucoside, cocoamidopropyl betaine and sophorolipids. This is followed by addition of fatty acids of Tung seed oil of Example 1 and sodium gluconate. This is followed by sodium chloride and finally pH is adjusted to 5.5 with citric acid solution. Remaining quantity of water is added. This is followed by color and fragrance and gentle agitation is continued to ensure the homogeneity of the composition.

Example 10

Preparation of Fruit and Vegetable Washing Composition Having High Natural Origin Index

| Components | (% W/W) |
| --- | --- |
| Sodium cocoyl glutamate (30%) | 30 |
| Sophorolipids (50%) | 5 |
| Sodium chloride | 1.0 |

-continued

| Components | (% W/W) |
|---|---|
| Fatty acids of Example 1 | 1.5 |
| Sodium gluconate | 0.5 |
| Citric acid (50%) | pH between 5.0 to 6.0 |
| Deionized water | Q.S. to make 100 |

Procedure:

To a gently stirred water (50%), both the surfactants are added in sequence, namely, sodium cocoyl glutamate and sophorolipids. To the stirred mixture added fatty acids of Tung seed oil of Example 1 and sodium gluconate. This is followed by addition of sodium chloride and finally pH is adjusted to 5.5 with citric acid solution. Remaining quantity of water is added and gentle agitation is continued to ensure the homogeneity of the composition. As is evident from the above Body wash (Example 2), Shampoo (Example 3), Sunscreen cream (Example 4), Face wash (Example 5) and hand dish-wash (Example 6) are formulated without any known preservative but with fatty acids derived by chemical transformation of Tung seed oil (Example 1) at concentration of 0.5 to 2% w/w. Body wash (Example 2) is made with 'sulphate-free' surfactants whereas shampoo of Example 3 is made with 'sulphate' surfactants. Both the formulations contain 2% of fatty acids of Example 1. Sunscreen cream (Example 4), unlike the aforesaid shampoo and body wash, is a 'leave-on' formulation and contains 0.75% of Tung fatty acids and facial cleanser formulation (Example 5 contains 1.5% Tung fatty acids. Hand dish wash (Example 6) contains 2.0% of fatty acids of Tung seed oil.

Examples 7 to 10 emphasize formulations with high natural origin index and mildness. These include again hair and skin cleansing as well as dish wash and fruit-vegetable wash. These formulations are based on biosurfactant sophorolipids that is biosynthesized using fermentation process as mentioned earlier. The non-pathogenic yeast, *Candida bombicola* that is fed with glucose and oleic acid. After isolating sophorolipids from the biomass it is preserved with 2% fatty acids of Tung seed oil. In addition to sophorolipids other bio-based surfactants are used, namely alkyl polyglucoside (APG) and amino acid surfactants, particularly, sodium cocoyl glutamate. Both, APG and sodium cocoyl glutamate are completely derived from renewable sources. In most cases the formulations are preserved with 1 to 1.5% of fatty acids of Tung seed oil. The inventors of the present invention have found that all home and personal care compositions (Examples 2 to 10) meet the challenge test criteria prescribed by PCPC (Washington, USA).

The log reduction of bacterial count observed in 28 days protocol of the challenge test is given in Example 2 and Example 3. It can be seen that more than 3 log reduction in case of bacteria and 2 log reduction for yeast and mold after seven days. These compositions are then kept for stability study at room temperature as well as at 40° C. The samples that kept at 40° C., when 're-challenged' for the efficacy of the preservation system again after a month, passed the 'repeat challenge' tests.

Advantages of the Invention

1) 'Renewable source' based alternative to current toxic and petrochemical based antimicrobials: The personal care and home care composition comprise 'whole' fatty acid composition derived from hydrolysis of Tung seed oil. Tung seed oil is available on commercial scale and is derived from seeds of nuts of Tung tree. Thus, the fatty acids are derived from a 'renewable' source and they are used as a 'whole' mix without altering, modifying or fractionating. Therefore, the process is unit operation saving.

2) Biodegradable: The fatty acids of Tung seed oil are readily bio-degradable and hence can be used for preservation of home and personal care products that are manufactured in millions of tonnes and consumed daily (for example, shampoo or liquid dish wash) and finally go to the environment.

3) Simple processing in line with the principles of 'Green Chemistry': The process of obtaining fatty acids from Tung seed oil involves inorganic base induced saponification and subsequent acidification by any mineral acid in aqueous medium. The byproduct of the process is glycerin which a completely nontoxic to environment. The 'whole' of fatty acids is used as antimicrobial preservative and formulated into home care and personal care products and there is no further processing or purification/fractionation involved. Thus, the process of isolating fatty acids from oil is a 'Green' process since it doesn't involve any petrochemical or hazardous reagent that is eco-toxic and the byproduct formed is eco-friendly as well. The yield of the process is quantitative and there is no chemical waste generated. There is no cost of waste disposal involved in this process.

4) Free from any inherent structural disadvantage: The fatty acids derived from hydrolysis of Tung oil do not contain any structural feature such as phenolic moiety, halogens or any formaldehyde releasing functionality that are associated with cytotoxic effects.

5) 'Stand-alone' preservation system: The compositions comprising 'whole' fatty acids (unfractionated) composition of Tung seed oil exhibits broad spectrum of antimicrobial activity covering bacteria, yeast and mold and hence these are useful as 'stand-alone' preservatives.

6) Compatibility: The 'whole' fatty acid composition that is used as preservative is compatible with commonly used ingredients in home and personal care products.

7) Synergy with other mild/nontoxic antimicrobials: As explained in the background that the arsenal of effective yet non-toxic antimicrobials has shrunk significantly to a very few gentle molecules with 'limited antimicrobial activity' like phenoxy ethanol, benzyl alcohol, benzoic acid, sorbic acid, dehydroacetic acid etc. Though these are relatively far less toxic and biodegradable compared to toxic halogen containing antimicrobials, it is relevant to mention here that these gentler antimicrobials are synthesized from petrochemicals (phenol, ethylene oxide, toluene, diketene, malonic acid and trans-butenal) and hence are not made from 'renewable' raw materials. In view of this fact, addition of fatty acids derived from Tung seed oil to the current limited arsenal of weak antimicrobials opens up several options of synergistic combinations for combinatorial approach for preservation. This approach is explained in 'detailed description section' where fatty acids are obtained Tung seed oil are used in combination with phenoxy ethanol. Synergistic combinations, due to their multi-pronged attack, don't allow microbes to adopt easily and be resistant.

8) Restoration of barrier function of skin and re-fatting effect: Long chain fatty acids are part of stratum corneum (SC, uppermost layer of skin) that play an important role in barrier function of SC keeping moisture balance of skin. During cleansing process by surfactants some of the lipids are lost. Composition comprising long chain fatty acids derived from Tung seed oil replace and replenish the lost lipids of skin and hair surface and play role in restoring the moisture balance.

We claim:

1. A personal care composition consisting of 0.5 to 2% w/w of an unfractionated whole of fatty acids derived from Tung seed oil and one or more personal care ingredients,
   wherein at least about 80% of the unfractionated whole of fatty acids is α-eleostearic acid (ESA), and wherein the one or more personal care ingredients are selected from:
   a. 2 to 20% w/w of surfactants,
   b. 1 to 20% w/w of UV absorbers,
   c. 1 to 10% w/w of inorganic sunscreens,
   d. 1 to 10% w/w of hair and skin benefitting agents,
   e. an adjuvant,
   f. 0 to 10% w/w of other additives selected from pearlizers, rheology modifiers, silicones, gums, film formers, emulsifiers, hydrotropes, antimicrobial compounds, and chelating agents,
   g. water,
   or a combination thereof,
   wherein the unfractionated whole of fatty acids is obtained by saponification of Tung seed oil and isolation of fatty acids after acidifying the saponified Tung seed oil.

2. The personal care composition as claimed in claim 1, wherein the surfactants are selected from anionic surfactants, amphoteric surfactants, zwitterionic surfactants, cationic surfactants, non-ionic surfactants and bio-surfactants.

3. The personal care composition as claimed in claim 1, wherein the UV absorbers are selected from Octocryolene, avobenzone, benzophenones, Octyl methoxy cinnamate, ethyl hexyl triazone, Tinosorb S, Homosalate and Octyl salicylate.

4. The personal care composition as claimed in claim 1, wherein the inorganic sunscreens are selected from ZnO, iron oxide, calamine, titanium dioxide and Kaoline.

5. The personal care composition as claimed in claim 1, wherein the skin and hair benefitting agents are selected from emollients, humectants, vitamins, synthetic and/or natural polymeric conditioners, vegetable oils, protein derivatives, anti-inflammatory anti-acne agents, anti-dandruff agents, moisturizers, botanicals and other skin and hair actives.

6. The personal care composition as claimed in claim 1, wherein the antimicrobial compound is selected from phenoxyethanol or benzoic acid.

7. The personal care composition as claimed in claim 1, wherein the adjuvant is selected from ethylhexyl glyceryl ether, caprylyl glycol, 1,3-propane diol and EDTA.

* * * * *